Dec. 27, 1960  A. E. FOX ET AL  2,966,436
PLASTER PANEL WITH METAL EDGES
Filed March 21, 1956
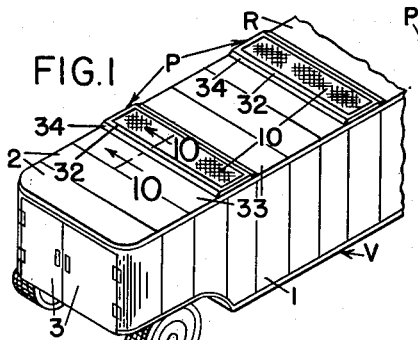
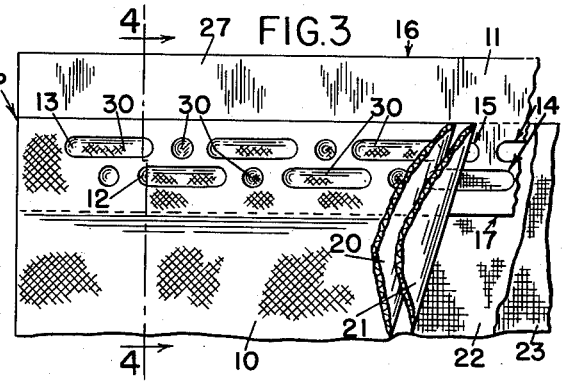
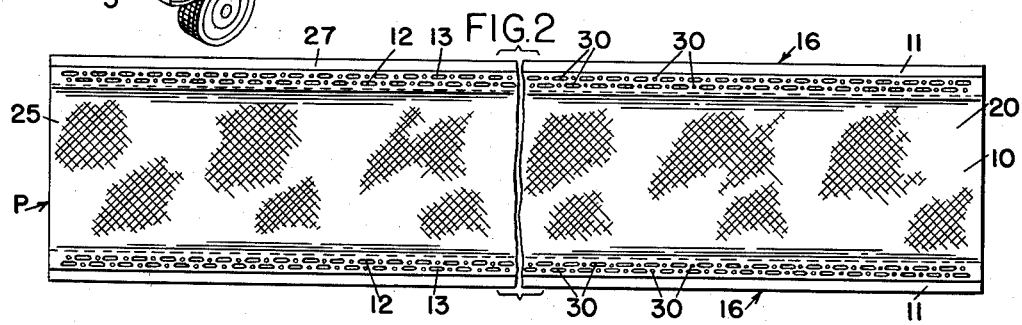
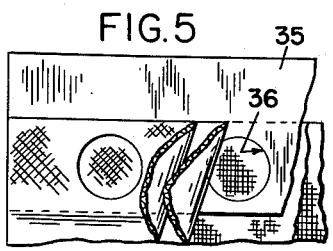
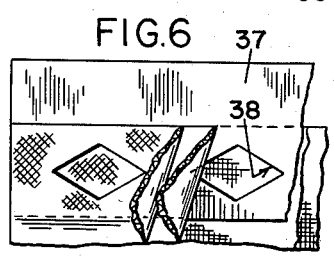
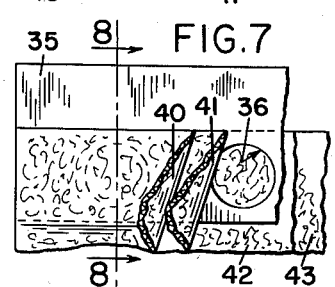
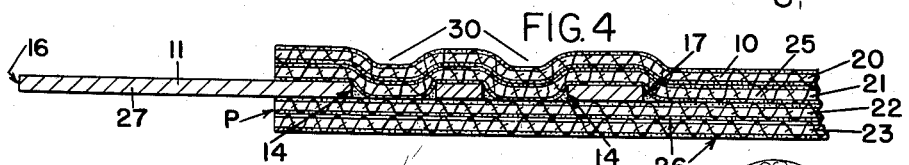
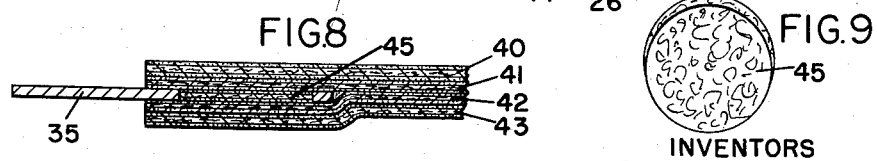
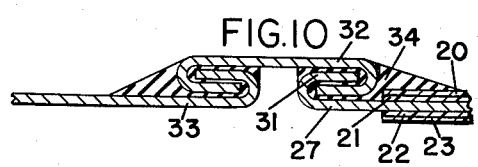
INVENTORS
ALDEN E. FOX
HERRIS M. MAXWELL
ORVILLE A. TYLER
Chas. T. Hawley
ATTORNEY

United States Patent Office 2,966,436
Patented Dec. 27, 1960

2,966,436

PLASTER PANEL WITH METAL EDGES

Alden E. Fox, Westfield, and Herris M. Maxwell, Longmeadow, Mass., and Orville A. Tyler, Suffield, Conn., assignors of one-half to The Crompton & Knowles Loom Works, Worcester, Mass., a corporation of Massachusetts, and one-half to Fruehauf Trailer Company, Detroit, Mich., a corporation of Michigan Filed Mar. 21, 1956, Ser. No. 572,972

4 Claims. (Cl. 154—45.9)

This invention relates to trailer trucks and similar vehicles and it is the general object of the invention to provide such a vehicle with a transparent or translucent top or side panel or panels made of a reinforced plastic material so made as to facilitate its attachment to the vehicle.

When packages, boxes, cartons and the like are placed at the forward end of a trailer truck it is frequently difficult for the driver to read the names on them if deliveries are to be made in transit. Flashlights and the like can be used but they are unhandy especially if two hands are needed to manipulate the package. It has been proposed heretofore to use small skylights at the corners of the truck to let in light but such interior illumination as they afford is not sufficient to permit reading a legend on a package which has other packages over it. It is an important object of the present invention to incorporate a light-transmitting panel into the strucure of the truck,either at the top or side, and locate the panel between the ends of the truck.. The panels will include a reinforced plastic material and be of considerable size.

Glass fibre reinforced plastics have gone into general use in a number of different fields but their use is generally restricted to those applications which do not require that nails, tacks or screws be passed through them in order to hold them in place, particularly when used out of doors. Where outdoor use, such as on a truck, does require penetration of the plastic special care is required in order to prevent cracking of the fabric when a screw or bolt is passed through it, and care also is required to make a water-tight seal between the plastic and the means for holding it in place.

It is a further object of the invention to provide a panel made with a pair of narrow thin metal edge strips which can be utilized for fastening the panel in place, the strips and the plastic material being held together in such a way as to avoid penetration of the plastic by any form of fastening means after it has been attached to the metal strips.

It is a still further object of the invention to make a panel of a plurality of layers of reinforcing material, such as fibre glass, and locate the layers partly on one side and partly on the opposite side of each metal strip having perforations therethrough and connecting the layers by a plastic resin which passes through the perforations to hold the layers and metallic strips firmly in position with respect to each other and in uninterrupted coplanar relationship with one of the layers. The layers may be made either of relatively open mesh woven glass fabrics or fibre glass mats, or similar material.

It is a further object of the invention to provide for attaching the metallic flat strips to the plastic material in such manner as to leave an exposed or uncovered edge and both sides of a part of the metallic strip extending beyond the plastic and affording means by which the panel can be held in a position without risk of damaging the plastic.

It is a still further object of the invention to provide an improved method for making a reinforced panel of the type mentioned hereinbefore.

In order that the invention may be clearly understood reference is made to the accompanying drawings which illustrate by way of example four embodiments of the invention and in which:

Fig. 1 is a perspective view of a trailer truck made according to the present invention and showing two of the panels extending across the top of the vehicle, Fig. 2 is a plan view of the preferred form of panel, Fig. 3 is an enlarged fragmentary view of one corner of the panel shown in Fig. 2 illustrating the manner of attaching the layers of reinforcing material to a metallic strip and setting forth one arrangement of perforations in the metal strip, Fig. 4 is an enlarged vertical section on line 4—4, Fig. 3, showing in detail the manner in which certain of the reinforcing layers extend down into the perforations to establish a holding relation with other layers and with the metal strip, Fig. 5 is a view somewhat similar to Fig. 3 but showing the first modified form of the invention, Fig. 6 is similar to Fig. 5 but shows a second modification, Fig. 7 shows a third modification in which a fibre mat is used instead of a woven glass fibre, Fig. 8 is an enlarged vertical section on line 8—8, Fig. 7, Fig. 9 is a detailed perspective view of one of the fibre mat fillers shown in Fig. 7, and Fig. 10 is a vertical section on line 10—10, Fig. 1, showing the manner in which one edge of the panel can be fastened in place on the roof of the trailer.

Fig. 1 shows one form of trailer truck made according to this invention. The truck has side and top plates or panels 1 and 2 respectively and rear doors 3 and provision is made at its front end by which it can be hauled. The panel forming part of the present invention can be used in place of any of the panels 1 or 2, but for illustrative purposes two translucent panels generally indicated at P extend across the roof R to admit light to the interior of the trailer to facilitate readings or markings on various packages which may be located in the trailer. The invention, however, is not limited to the use of two light transmitting panels on the top of the vehicle V as shown in Fig. 1.

Referring to Fig. 2 which shows the preferred form of panel P the latter includes a center sheet 10 made of several layers of fibre glass reinforced plastic laminates having secured to the opposite edges thereof thin metal strips 11. These strips are perfectly parallel and may be made of any appropriate material, such as sheet aluminum. Referring more particularly to Fig. 3 part of one of the metal strips is shown as having formed adjacent to the inner edge thereof two rows 12 and 13 of perforations which are in crosswise alignment with similar holes in the other metal strip, each row having elongated slots 14 alternating with circular holes 15. The circular holes of one row are preferably opposite elongated slots in the other row. The perforations are spaced a substantial distance from the outer edge 16 of the strip 11 and are nearer the inner edge 17 of the strip.

The translucent sheet body 10 is made up as shown in Fig. 3 of four different layers of woven glass fabric reinforcing, these layers, reading from top to bottom in Fig. 3, being indicated at 20, 21, 22 and 23. The central body 25 of the sheet 10 has all four of the layers fitted close to each other and held together by a plastic resin material designated at 26. The upper layers 20 and 21 extend from the central body over part of the top of the metal strip 11 and then are depressed somewhat into the perforations 14 or 15 in the inner row 12 of perforations, then rise over another part of the metal strip and again are depressed into other perforations in the outer row 13, after which the layers 20 and 21 extend toward the outer edge of the strip 11 but fall short of the outer edge by a considerable amount to present an uncovered exposed part 27 which extends along the length of the panel substantially parallel to edge 17 and intermediate edges 16 and 17.

The two lower layers 22 and 23 extend without very much deformation across the perforations on the bottom of the metal strip as shown more particularly in Fig. 4. It is to be understood that a construction similar to that shown in Fig. 4 is present on each lengthwise edge of the panel and that the four layers of reinforcement material are all substantially the same length as that of the side strips 11 and that the perforations in each strip are adjacent and parallel to the corresponding edge of the plastic panel 10, the parts of layers of plastic material within the perforations substantially occupying the latter and coacting therewith to establish an interlocking relationship therebetween.

The panel thus far described may be made in any approved manner but has been satisfactorily produced by the so-called vacuum bag molding method on a table not shown herein but having preferably a flat metallic top surface on which the lower layers 23 and 22 are first placed, after which the metal strips 11 are placed over lengthwise edges of these two strips and positioned by stop pins or the like so that the edges 16 of the two strips will be parallel. The two top layers 21 and 20 are then placed over the lower layers and over-lap part of each of the metal strips, as will be understood from Fig. 4. A polyester resin is then poured onto the top layer 20 along the central body 25 and penetrates down through the lower layers. The metal strips and the layers are then covered with an airtight plastic which may be a thin polyvinyl alcohol sheet which may have a thickness of .002". This sheet is then clamped around the edges of the table to form an airtight seal, after which a vacuum pump is connected pneumatically to the under side of the sheet to exhaust the air, whereupon the sheet is drawn down tightly against the layers of fibre glass and the plastic material is spread to some extent. By manual operation the spreading is then completed until the resin has penetrated all four of the layers and has been caused to flow up over those parts of layers 20 and 21 which extend over the metal strips 11 and into the perforations 14 and 15. The resin extends through the perforations to establish a bond with the resin in the two lower layers 22 and 23 below them. The reduced pressure causes the upper layers to sink somewhat into the perforations to form cavities 30, as shown in Fig. 4. In this way all four of the layers of glass fibre are connected together by the resin through the perforations and the depressed parts of the top layers 20 and 21 in the perforations effectively position the metal strips with respect to the layers to prevent relative movement between the strip and the layers. The layers 20–23 form a plastic panel which secures to itself the metal strips in substantial coplaner relationship with layer 21 when bonding of layers 20–23 through perforations 14 and 15 occurs.

The resin is preferably of the thermosetting type which can set at room temperatures at least sufficiently to permit handling after the lapse of a few minutes. The resin may be of the ingredients shown in the following Table A:

Table A

I. 37½ lbs. polyester light stable resin
II. 340 grams styrene monomer
III. 40 grams oleic acid
IV. 86 grams ATC (catalyst)
V. 86 grams cobalt naphthenate solution (accelerator)
VI. To each 2½ lb. batch of above, 22 grams of JDB (catalyst) is added Item IV in Table A is a catalyst made by the Lucidol Division of Wallace and Tiernan Company of Buffalo, N.Y., and contains a minimum of 50% benzoyl peroxide and a minimum of 3.3% active oxygen. These ingredients are compounded with tricresyl phosphate. If the entire setting operation of the resin is to occur at room temperatures this item IV may be omitted, since its chief use is to hasten setting under heat.

Item V is an accelerator made by the Nuodex Products Co.

Item VI is also made by Wallace and Tiernan Company and contains a minimum of 50% of cyclohexanone peroxide and a minimum of 6.5% active oxygen compounded with dibutyl phthalate. This item is a catalyst to be used in place of item IV if the setting of the resin is to take place at room temperature.

The ingredients I–III and V are mixed in one pot or holder and the item VI in a separate holder. Just prior to spreading the resin on the fibre glass the catalyst in item VI is mixed with the other ingredients and thoroughly stirred and then immediately poured. In order to protect the upper exposed surfaces of the metal strips 11 they may be coated with a tape and in order to facilitate application of the vacuum this tape may have mounted thereon a strip of jute material loosely bonded and permitting air currents to pass throught it. The inlet from the vacuum pump opens directly to this material so that air can be withdrawn from 11 of the space over which the thin polyvinyl alcohol sheet extends. The resin is then manually spread by hand operated plates pressed against and moved along the polyvinyl sheet so that it flows over all of the fibre glass and through the perforations 14 and 15.

After sufficient time is allowed for a substantial degree of setting of the polyester resin it is then removed from the table and if a quick setting is desired it is subjected to a subsequent heating in an oven at temperatures from 150 to 250° F. The panel is then ready for use which, as contemplated herein, will include the up bending of the outer edges of the exposed parts 27 of the strips 11 as at 31 for interlocking with a strap 32 which has a similar interlocking with a metal plate 33 forming an adjacent top panel 2, see Fig. 10. After the parts have been bent as shown any cracks or open spaces may be filled with water-tight compound of any desired kind, indicated at 34.

Instead of having the two rows of perforations as shown in Fig. 3, edge plates 35, see Fig. 5, similar to the metallic strips 11 may have circular holes 36 punched therein and as a still further modification as shown in Fig. 6 the metallic strip 37 may have diamond shaped holes 38. In both of these forms shown in Figs. 5 and 6 the process of manufacture will be as already described in connection with Fig. 3, the upper layers sinking into the perforations 36 or 38 as the case may be so as to prevent relative movement between the strips 35 and 37 with respect to the layers of reinforcement.

The forms of the invention thus far described contemplate the use of reinforcements in the form of woven glass fabric the warp and weft of which are preferably perpendicular to each other and the warp of which preferably runs lengthwise of the panel as suggested in the right hand part of Fig. 3. The invention can, however, be utilized in connection with the modification set forth in Fig. 7 wherein the layers are in the form of loosely bonded glass fibre mats, the four layers of matting being shown at 40, 41, 42 and 43 and corresponding to the layers 20–23 of the preferred form of the invention. In the modification shown in Fig. 7, however, the metallic strips 35 will have each of their perforations 36 filled with a filler 45 of fibre glass mat material so that the polyester resin will extend down through five layers of reinforcement, the four layers 40–43 and also the layer provided for the filler 45. The filler 45 is designed to fit snugly into its perforation 36 and the bonding of all five layers through the perforations affected by the polyester resin establishes a close holding relation between the layers and the metallic strip. It is to be understood that if desired the layers shown in Fig. 7 can be made of woven fabric of which material the filler 45 may also be made, and it is further to be understood that the particular form of perforations shown in Fig. 7 is not the only form which can be used, since it will be possible to use the types of perforation shown in Figs. 3 or 6, or any equivalent of them.

Fig. 8 shows the filler 45 as the fifth layer of reinforcing material through which the resin passes to connect the upper and lower layers with an integrated plastic material closely bonded to the strip 35. It is further to be understood that although four layers have been described herein, two above and two below the metallic strip, the invention is not necessarily limited to this number of layers but a panel made with four layers employing either a woven or a mat glass fiber reinforcement, Fig. 7, operates quite satisfactorily when used outdoors in such positions as suggested in Fig. 1.

In the form of the invention shown in Fig. 2, for instance, the two metallic strips are shown as being the same width and separate and remote from each other, but the invention is not to be limited to a panel made in this way since one of these strips can be considerably wider than the other when it is desired to make a panel to fill the space left by removal of the previous panel in trailer trucks already built. In some instances it is found that panels of existing trailer trucks are wider than it is now convenient to make the light-transmitting panel and under these conditions it is preferred to have one of the strips 11 much wider than shown.

From the foregoing it will be seen that the invention sets forth a trailer truck having a light-transmitting panel which is incorporated into the structure of the truck and can be used as a replacement for an otherwise opaque panel. The panel can extend across the top as shown or it can be used on a side so that one or more of either the panels 1 or 2 can be replaced by the panel set forth herein. It will also be seen that the panel has metallic strips attached to the edges of the reinforced plastic material in such a way as to avoid penetration of the plastic by any form of fastening means. The perforations along the inner edges of the metallic strips 11 afford means by which the upper and lower layers of reinforcing fibre glass can be connected to each other by an integral bond consisting of the resin extending from the top layer through the perforations to a lower layer. Furthermore, the fact that the layers on at least one side of the metal strip extend down into the perforations establishes a mechanical holding relation between the layers and the metal strip in addition to any adhesion which may exist between these two parts. Also, the invention set forth a method by which a partial vacuum or reduced pressures are relied upon to draw at least one of the layers down into the perforations, the reinforcing layers being drawn at the same time that the plastic resin is caused to flow through the perforations to bond the layers above and below the metallic plate 11.

Having now particularly described and ascertained the nature of the invention and in what manner the same is to be performed, what is claimed is:

1. In a reenforced plastic panel having layers of light transmitting plastic material reenforced with fiber glass, a pair of narrow flat strips of sheet metal in uninterrupted substantially coplanar relationship with one another and one of said layers, each strip extending from one end to the other end of said panel and each strip having perforations between its inner and outer edges in crosswise alignment with the other strip, the perforations of each strip passing therethrough and in adjacent and parallel relationship to a longitudinal edge of said panel, said strips being partially covered on each side thereof by said layers which terminate between the longitudinal edges of said strips for interconnecting coplanar relationship between the strips from one end to the other end thereof to cover said perforations with portions of at least one of said layers extending through the perforations of each strip to be joined to another of said layers by plastic material passing through said perforations from said one of said layers to said another of said layers to effect bonding therebetween to secure said strip to said panel, and a lengthwise part of each strip including an edge thereof to extend beyond the longitudinal edge of the plastic panel along the length thereof and having both sides of said part in exposed and uncovered relationship with respect to said panel.

2. The panel set forth in claim 1 wherein said strips are separate and remote from each other and are locked in parallel and coplanar relationship with each other by the layers which extend from strip to strip to maintain said relationship due to the bonding of the layers through said perforations and with said one of said layers extending from inner edge to inner edge of said strips in coplanar relationship thereto.

3. The panel set forth in claim 1 wherein the layer which extends into the perforations and between the inner edges of and in the same plane as said strips is bonded to another layer at points closely adjacent to the peripheries of the perforations and said inner edges respectively to position said strip with respect to said layers so as to prevent relative movement between said strip and said layers.

4. In a reenforced plastic panel having layers of light transmitting plastic material reenforced with fibre glass, a pair of narrow flat strips of sheet metal remote from each other in uninterrupted coplanar relationship with one another and one of said layers, each strip extending from one end to the other end of said panel and each strip having perforations between its inner and outer edges, the perforations of each strip passing therethrough and in adjacent and parallel relationship to a longitudinal edge of said panel, said strips being partially covered on each side thereof by said layers which terminate between the longitudinal edges of said strip from one end to the other end thereof to cover said perforations and to expose both sides of an uncovered part of each strip along the length of the latter, and individual fibre glass fillers to occupy said perforations and being bonded to said layers by a plastic material passing through said perforations and fillers to join said layers on opposite surfaces of each strip to effect bonding between the layers.

References Cited in the file of this patent
UNITED STATES PATENTS

| | | |
|---|---|---|
| 1,962,584 | Davies | June 12, 1934 |
| 2,048,895 | Rosen | July 28, 1936 |
| 2,223,740 | Quest | Dec. 3, 1940 |
| 2,316,766 | Beckwith et al. | Apr. 20, 1943 |
| 2,341,130 | Unsworth | Feb. 8, 1944 |
| 2,446,524 | Brennan | Aug. 10, 1948 |
| 2,604,422 | Pizak | July 22, 1952 |
| 2,692,389 | Lamkin | Oct. 26, 1954 |
| 2,728,702 | Simon et al. | Dec. 27, 1955 |
| 2,736,677 | Eisler | Feb. 28, 1956 |
| 2,742,390 | Beck | Apr. 17, 1956 |

FOREIGN PATENTS

| | | |
|---|---|---|
| 401,558 | Great Britain | Nov. 16, 1933 |
| 507,957 | Great Britain | June 23, 1939 |

OTHER REFERENCES

Article in "Modern Plastics" Magazine, December 1950, page 92.

"Fleet Built Plastic Bodies" in "Commercial Car Journal," February 1954, pages 82, 83, 130 and 131,

UNITED STATES PATENT OFFICE
CERTIFICATION OF CORRECTION

Patent No. 2,966,436                        December 27, 1960

Alden E. Fox et al.

It is hereby certified that error appears in the above numbered patent requiring correction and that the said Letters Patent should read as corrected below.

In the sheet containing drawings, line 2, and in the heading to the printed specification, line 2, title of invention, for "PLASTER PANEL WITH METAL EDGES", each occurrence, read -- PLASTIC PANEL WITH METAL EDGES --.

Signed and sealed this 8th day of August 1961.

(SEAL)
Attest:

ERNEST W. SWIDER                      DAVID L. LADD
Attesting Officer                      Commissioner of Patents